May 3, 1932.  W. T. DEAN  1,857,045
PACKING
Filed July 10, 1928
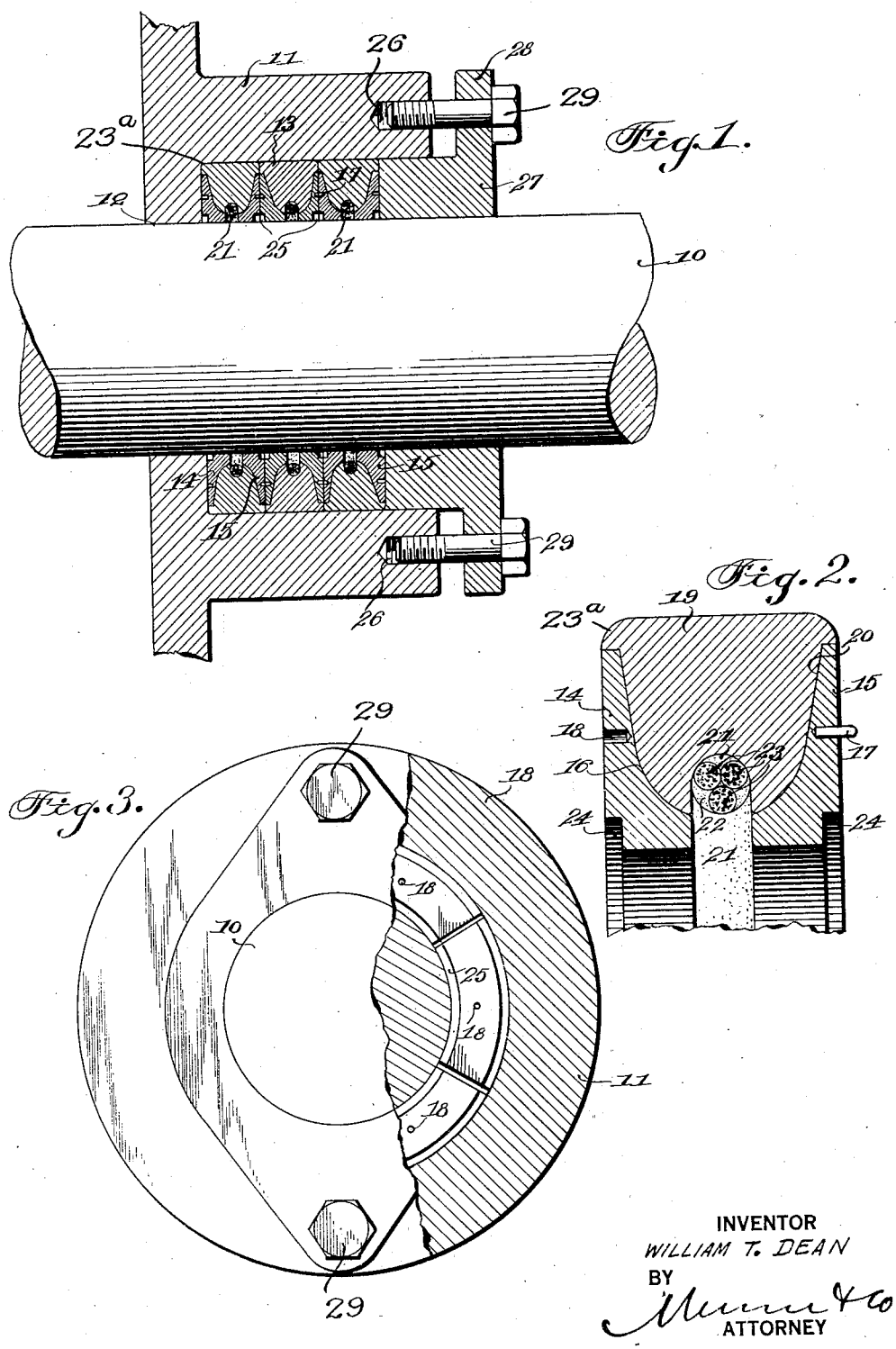
INVENTOR
WILLIAM T. DEAN
BY
ATTORNEY Patented May 3, 1932

1,857,045

UNITED STATES PATENT OFFICE

WILLIAM T. DEAN, OF BEAUMONT, TEXAS, ASSIGNOR TO SWITZER PACKING COMPANY, OF BEAUMONT, TEXAS, A CORPORATION OF TEXAS

PACKING

Application filed July 10, 1928. Serial No. 291,643.

This invention relates to improvements in packing glands.

Among the objects of the invention is to provide a packing gland which is simple in structure and durable, and adapted for either a reciprocating shaft or rotary shaft in any type of machine or device whereby gases or fluids are handled and packing glands are necessary.

It is also a purpose of the invention to provide a packing of the above character that may be easily assembled and applied to a shaft and easily adjusted for wear.

It is a further and important object of the invention that the packing gland is self adjusting for alignment of a shaft.

A still further object is that the metallic parts of the packing are not subject to any appreciable wear with rotation or reciprocation of the associated shaft.

Other objects, and objects relating to details of construction, combination and arrangement of parts will hereafter appear in the detail description to follow.

The invention is illustrated by way of example in the accompanying drawings, in which, Figure 1 is a sectional view of a packing embodying the present invention, Figure 2 is an enlarged transverse section of a packing unit of this invention, and Figure 3 is an outer end view partly in elevation and partly in section, the latter illustrating the segmental rings of the packing.

Referring to the drawings more particularly, 10 indicates a shaft and 11 a hub or packing housing. The hub or housing 11 may be fitted about the shaft 10 as at 12 and the interior of the housing is enlarged as at 13 to provide an annular opening for the reception of the packing. The packing preferably comprises a plurality of packing gland units as shown to advantage in Figure 1. Each packing unit comprises two rings 14 and 15, complemental in structure and adapted to provide an annular groove 16, when arranged in assembled relation. The rings 14 and 15 are preferably segmental as shown with a dowel pin 17 that may engage in a suitable opening 18 in an opposing ring of an adjacent packing unit.

Within the groove 16 formed by rings 14 and 15 of each packing unit is placed what may be termed a backing ring. This backing ring is designated by the reference numeral 19 and is preferably of rubber of heat resisting quality or character or other substance having suitable resiliency and heat resistance. The backing ring 19 is so shaped that its sides 20 conform to the curvature of the inner sides of the rings 14 and 15 forming grooves 16. However, the ring 19 is of such thickness that normally the inner edges of the rings 14 and 15 of each packing unit are spaced as shown at 21.

Each backing ring 19 is provided with a groove 22 upon its inner periphery in which there is placed a lubricating rope or cord preferably constituting a plurality of strands 23 of fibrous material impregnated with tallow, graphite, or other suitable lubricant.

As best shown in Figure 2, the backing ring 19 is formed with protrusions or extensions 23a about its outer periphery, that are adapted to seat upon the outer peripheries of the associated rings 14—15. It will also be noted that each of the rings 14—15 has its outer side provided with an offset 24 about its inner periphery. The offsets provide grooves 25 when the packing units are arranged in assembled relation. It should be further noted that the dowel pins 17 enable the rings 14—15 of the packing units to be held so that the place of joinder of the different sections constituting a ring are offset from those of an adjacent ring.

The hub or housing 11 is provided at its outer end with openings 26. A gland follower 27 is provided having an annular flange 28. The flange 28 carries machine bolts 29 threaded into the openings 26 of the housing 11 and serve to force the follower 27 into the housing 11 as illustrated to advantage in Figure 1.

It is thought from the foregoing description, a clear understanding of the structure and assembly of the different parts and units constituting the packing of this invention can be had. With the segmental rings 14—15 and the resilient backing rings 19, the packing units as a whole forms a flexible form of packing gland. As seen in Figure 3, the segments forming the rings 14—15 are slightly spaced from each other and permit take-up for wear. By bringing pressure upon the packing units through the follower 27, the rings 19 are compressed and the tightness of the packing increased. Also, it is pointed out that the backing rings 19 essentially serve as seats for the rings 14—15 and thus enable these rings to arrange themselves to suit the alignment of the shaft 10. Due to the rings 19, the rings 14—15 cannot serve as bearings for shaft 10.

It is also to be noted that the offsets 24 in the rings 14—15 in conjunction with the spaces 21, form a labyrinth packing in addition to the sealing of rings 19 and rings 14—15.

While I have described and shown a particular application of my invention, it is to be understood that the invention is not to be so limited as indicated by the appended claim.

I claim:

In a rod packing, a shaft and housing, a packing within the housing comprising a plurality of packing units, each unit including a pair of metallic rings adapted to form an annular groove between the opposing sides thereof, a ring of resilient material within each groove and extending outwardly therefrom to fit within the packing housing and hold the associated pair of rings spaced from each other, each of said rings having a planiform face for abutting relation with the planiform face of the next ring of the adjacent unit, said rings further having their outer edges formed with an offset about its inner periphery, said resilient rings having an annular groove upon their inner periphery, a compressible lubricant means in said grooves, and means for applying pressure against the sides of said metallic rings for compression of said resilient rings.

Signed at Beaumont, in the county of Jefferson and State of Texas, this 18th day of October, A. D. 1927.

WILLIAM T. DEAN.